US 6,414,730 B1

United States Patent
Akamatsu et al.

(10) Patent No.: US 6,414,730 B1
(45) Date of Patent: Jul. 2, 2002

(54) LIQUID CRYSTAL DISPLAY DEVICE AND METHOD FOR MANUFACTURING THE SAME

(75) Inventors: Keiichi Akamatsu; Yoshinori Shimada, both of Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/426,584

(22) Filed: Oct. 25, 1999

(30) Foreign Application Priority Data

Oct. 26, 1998 (JP) .......................................... 10-304452
Aug. 6, 1999 (JP) .......................................... 11-224483

(51) Int. Cl.[7] .............................................. G02F 1/136
(52) U.S. Cl. ............................... 349/43; 349/44; 438/30
(58) Field of Search ............................. 349/43, 44, 38; 438/30

(56) References Cited

U.S. PATENT DOCUMENTS 5,847,781 A * 12/1998 Ono et al. ..................... 349/44
5,917,571 A    6/1999 Shimada
6,091,466 A * 7/2000 Kim et al. ..................... 349/43
6,300,152 B1 * 10/2001 Kim ............................. 438/30

FOREIGN PATENT DOCUMENTS

| JP | 58-172685 A | 10/1983 |
| JP | 9-5788 A | 1/1997 |
| JP | 9-73100 A | 3/1997 |
| JP | 9-325330 A | 12/1997 |

* cited by examiner

Primary Examiner—Toan Ton
Assistant Examiner—David Chung
(74) Attorney, Agent, or Firm—Niixon & Vanderhye P.C.

(57) ABSTRACT

There is provided a liquid crystal display device which utilizes low resistance metal wiring and in which pixel electrodes and drain electrodes can be reliably connected and a method for manufacturing the same. Gate electrodes connected to gate signal lines are formed on a transparent insulating substrate, and a gate insulation film is formed to cover the same. A semiconductor layer, source electrodes and drain electrodes are formed over the gate electrodes, and a metal layer to become source signal lines and source and drain extraction electrodes is formed. The metal layer is formed by stacking a titanium film and an aluminum film. The interlayer insulation film is formed to cover TFTs, gate signal lines and source signal lines. Through holes are formed in the interlayer insulation film to expose at least a part of the periphery of the drain extraction electrodes. Pixel electrodes are formed to cover the through holes.

12 Claims, 16 Drawing Sheets

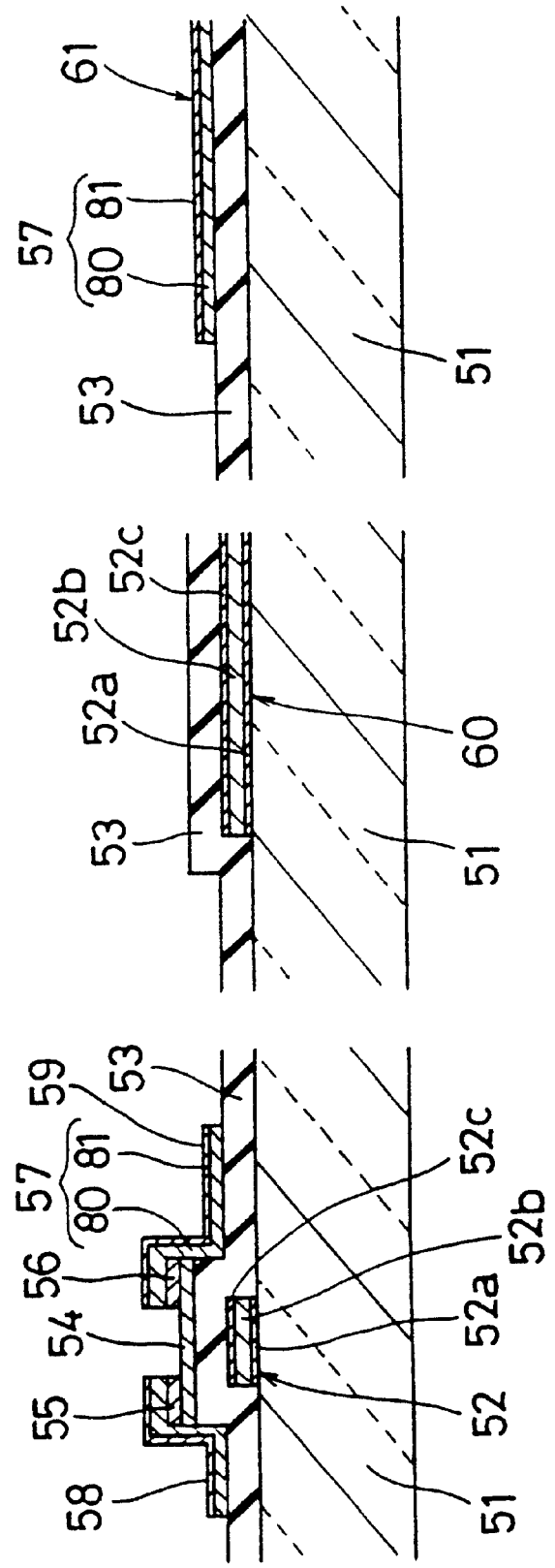

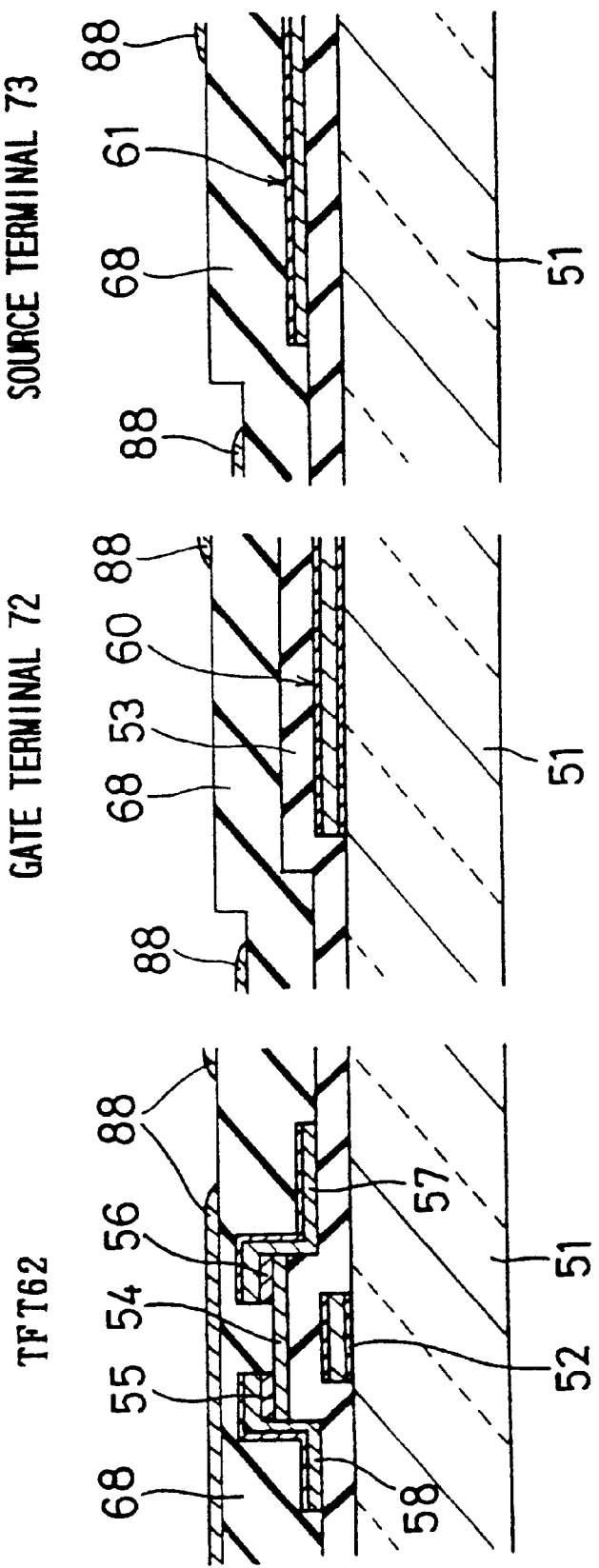

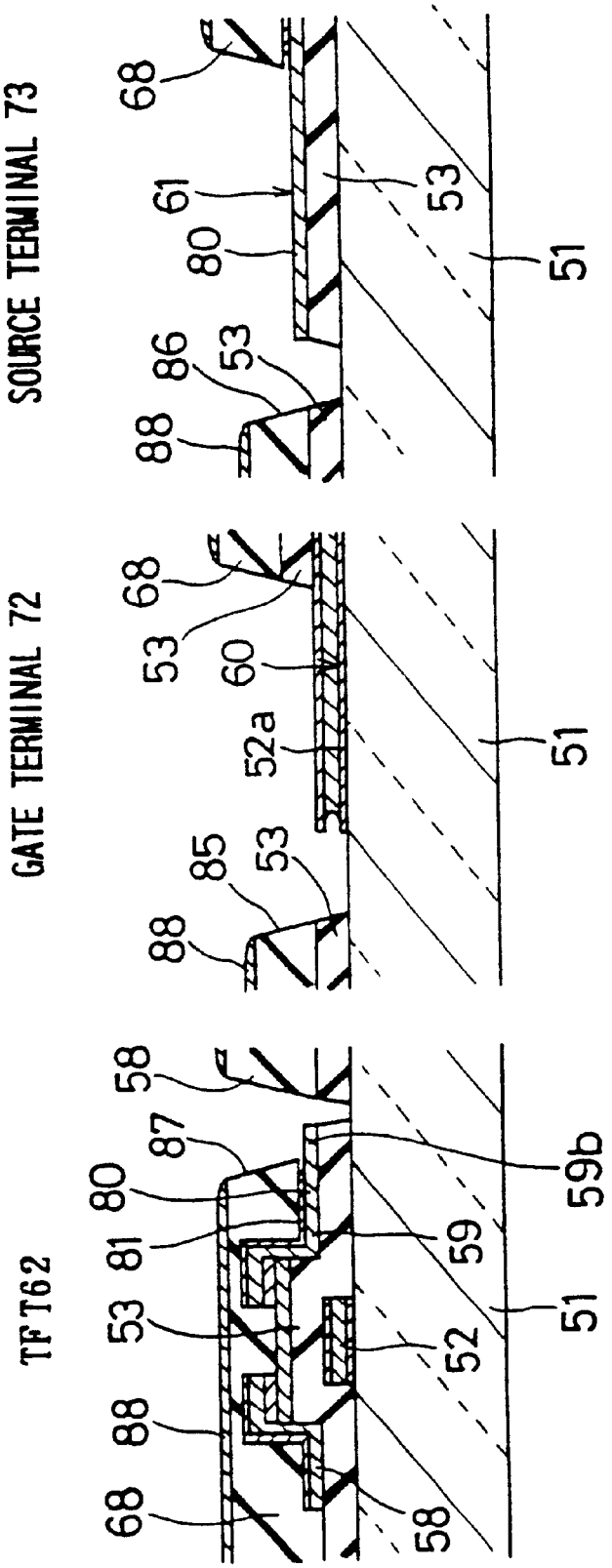

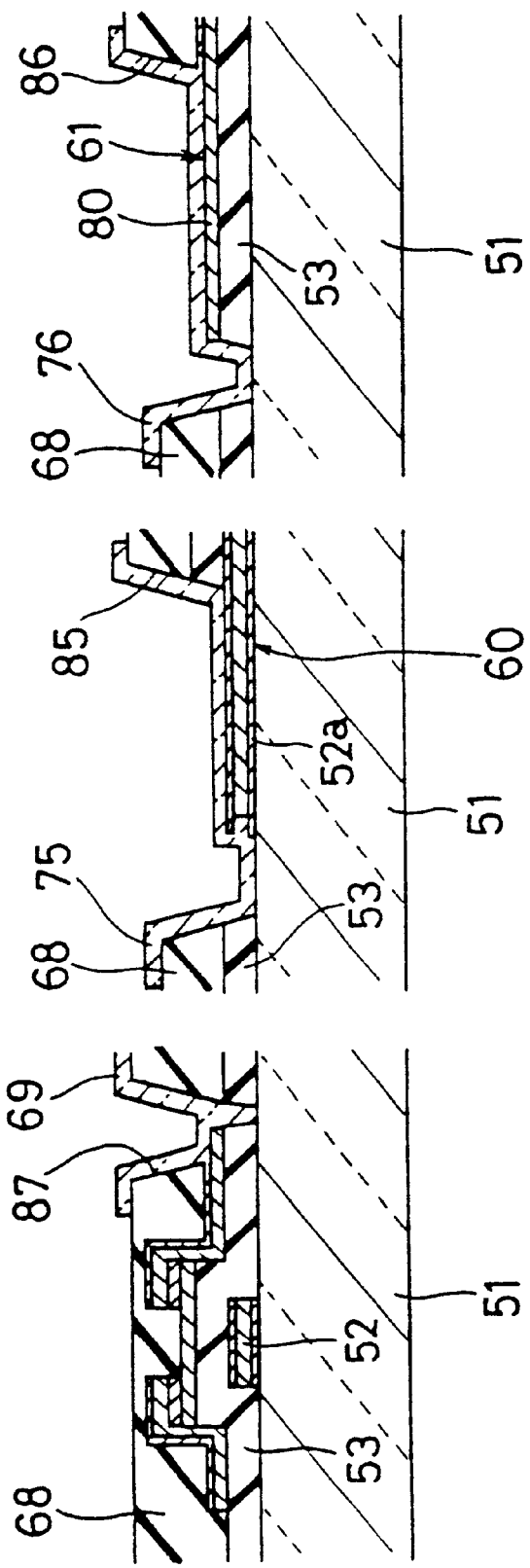

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device for displaying images and characters using liquid crystal and a method for manufacturing the same.

2. Description of the Related Art

There are known active matrix type display devices as an above-mentioned type liquid crystal display device, in which switching elements such as thin film transistors (hereinafter referred to as "TFTs") are provided on one of a pair of substrates disposed so as to confront each other with a liquid crystal layer between to apply an electric field to each pixel.

FIG. 12 is a schematic diagram of a configuration of an active matrix substrate 1 which is one of substrates of a liquid crystal display device using TFTs. In the liquid crystal display device are formed TFTs 2 of switching elements and pixel capacities 3 in a matrix form. A plurality of gate signal lines 4 and source signal lines 5 are disposed so as to intersect each other at right angles. The gate signal lines 4 are connected to the gate electrodes of the TFTs 2 which are driven by signals inputted thereto. The source signal lines 5 are connected to the source electrodes of the TFTs 2 to input video signals thereto. Pixel electrodes 7 which are electrodes of the pixel capacities 3 at one side thereof are connected to drain electrodes 6 of the TFTs 2. Electrodes of the pixel capacities at the other side thereof are counter electrodes disposed on a counter substrate which faces the active matrix substrate 1 when the liquid crystal display device is formed.

FIG. 13 is a plan view showing a structure of the active matrix substrate 1. FIG. 14A is a sectional view taken along line A1—A1 in FIG. 13. FIG. 14B is a sectional view taken along line B1—B1 in FIG. 13. FIG. 14C is a sectional view taken along line C1—C1 in FIG. 13. The active matrix substrate 1 comprises gate electrodes 11, gate signal lines 4, a semiconductor layer 13, an $n^+$-Si layer to become source electrodes 8 and drain electrodes 6, a metal layer to become source signal lines 5 and source and drain extraction electrodes 14 and 15, an interlayer insulation film 16 and a transparent conductive film (ITO: indium tin oxide) to become the pixel electrodes 7 which are sequentially formed on a transparent insulating substrate 10. The pixel electrodes 7 are connected to the drain electrodes 6 of the TFTs via through holes 21 extending through the interlayer insulation film 16 and the drain extraction electrodes 15. Gate terminals 22 and source terminals 23 are provided at the ends of the gate signal lines 4 and source signal line 5, respectively.

Since the interlayer insulation film 16 is interposed between the gate signal lines 4 and source signal lines 5 and the pixel electrodes 7, the pixel electrodes 7 can overlap upon the signal lines 4 and 5. Such a structure is disclosed in, for example, Japanese Unexamined Patent Publication JP-A 58-172685 (1983) and is known to be effective, for example, in improving a numerical aperture and suppressing poor alignment of liquid crystal by shielding an electrical field generated by the signal lines.

An example of manufacturing steps for the active matrix substrate 1.

The gate signal lines 4 and gate electrodes 11 are first fabricated on the transparent insulating substrate 10, and the gate insulation film 12 to allow the source signal lines 5 to overlap, an i-Si layer to become the semiconductor layer 13 and the $n^+$-Si layer to become the source electrodes 8 and drain electrodes 6 are continuously formed. Subsequently, $n^{30}$-Si layer to become the source electrodes 8 and drain electrodes 6 and the semiconductor layer 13 to cause TFT operations are patterned. Masked etching is carried out to form the contact holes 20 to establish electrical contact with the gate electrodes 11 on the gate insulation film 12 in order to allow input of further signals. The steps up to this point are related to formation of the gate terminals 22 as shown in FIG. 14B.

Next, the metal layer to become the source extraction electrodes 14, the source signal lines 5 and drain extraction electrodes 15 is fabricated; the interlayer insulation film 16 is formed to insulate them from the pixel electrodes 7; and masked etching is carried out to form contact holes 24 for inputting signals to the source signal lines 5 and the through holes 21 for inputting signals to the drain extraction electrodes 15. The steps up to this point form the source terminals as shown in FIG. 14C.

Finally, the transparent conductive film to become the pixel electrodes 7 is formed to form the section as shown in FIG. 14A. The fabrication of the active matrix substrate 1 is thus completed.

The recent trend toward larger and high resolution liquid crystal display devices has resulted in demands for wiring with low resistance metallic material. Aluminum films or aluminum alloy films primarily constituted by aluminum have come to attention as low resistance metal wiring materials because they are relatively inexpensive and are easy to form. Another pressing need is to reduce manufacturing steps in order to fabricate liquid crystal displays with high quality at low cost to achieve price reduction.

The above-described method for manufacturing the active matrix substrate 1 for the liquid crystal display device requires two masked etching steps, i.e., the step of performing masked etching on the gate insulation film 12 to form the contact holes 20 in order to form the gate terminals 22 and the step of performing masked etching on the interlayer insulation film 16 to form the contact holes 24 for the source terminals 23 and the through holes 21 for connecting the pixel electrodes 7. On the contrary, the number of times of the masked etching can be reduced to one, for example, by performing the step of forming the contact holes 20 in the gate insulation film 12 and the step of forming the contact holes 23 and through holes 21 in the interlayer insulation film simultaneously to fabricate a liquid crystal display device at a low cost. For example, such a method of manufacture is disclosed in Japanese Unexamined Patent Publication JP-A 9-73100 (1997). According to this publication, the number of steps can be reduced by using a metal film as an etching stopper layer to provide selectivity during the etching of an insulation film. Aluminum, titanium, chromium and alloys of them are named as metals having such a function.

It is possible to propose a method in which an aluminum film or an aluminum alloy film primarily made of aluminum, which serves also as a low resistance metal film, is formed on the drain extraction electrodes 15, for example, simultaneously performing the step of forming the contact holes 20 in the gate insulation film 12 and the step of forming the contact holes 24 and through holes 21 in the interlayer insulation film 16, as proposed in Japanese Unexamined Patent Publication JP-A 9-73100 (1997).

However, since the aluminum film or aluminum alloy film primarily made of aluminum which serves as an etch stopper layer and a low resistance metal film can not contact the transparent conductive film (ITO) as the pixel electrodes 7, the low resistance metal film on the drain extraction electrodes 15 which face the through holes 21 must be removed by means of wet etching after the through holes 21 are formed. However, since wet etching is anisotropic etching, side etching (over-etching) occurs under the interlayer insulation film 16 as shown in FIG. 15, which results in the formation of a step 25. As shown in FIG. 13, since the bottom of the through hole 21 is formed smaller than the end of the drain extraction electrode 15 such that the drain extraction electrode 15 is exposed on the entire area of the bottom, a side etch region 26 as a result of the wet etching is formed along the entire circumference of the bottom of the through hole 21. When the transparent conductive film to become the pixel electrodes 7 is formed on the step 25 formed as a result of etch shift attributable to the side etch region 26, disconnection may occur at the step 25 as shown in FIG. 16. Since the step 25 is formed along the entire circumference of the bottom of the through hole 21 as described above, disconnection can occur along the entire circumference. In this case, poor contact occurs between the transparent conductive film and the drain extraction electrodes 15.

A description will now be made on a second conventional active matrix substrate 30 having auxiliary capacities. FIG. 17 is a plan view showing a structure of the active matrix substrate 30. FIG. 18A is a sectional view taken along line A2—A2 in FIG. 17. FIG. 18B is a sectional view taken along line B2—B2 in FIG. 17. FIG. 18C is a sectional view taken along line C2—C2 in FIG. 17. FIG. 18D is a sectional view taken along line D2—D2 in FIG. 17. Parts corresponding to parts of the active matrix substrate 1 shown in FIGS. 13 and 14A through 14C are indicated by the same reference numbers.

The active matrix substrate 30 comprises gate signal lines 4 and gate electrodes 11 connected to the gate signal lines 4 formed on a transparent insulating substrate 10. Auxiliary capacity signal lines 25 are formed in parallel with the gate signal lines 4 as shown in FIG. 17, and a gate insulation film 32 is formed to cover them. A semiconductor layer 13 is formed such that it overlaps the gate electrodes 11, and an n$^+$-Si layer to become source electrodes 8 and drain electrodes 6 are formed to cover a part of the semiconductor layer 13. Source extraction electrodes 14 connected to the source electrodes 8 are formed by patterning a metal film along with source signal lines 5. The metal film located over the drain electrodes 6 is formed with drain extraction electrodes 15 which are connected to the drain electrodes at one end thereof and which constitute auxiliary capacities at the other end thereof. Auxiliary capacities 27 of the drain extraction electrodes 15 are provided over auxiliary capacity signal lines 25, and auxiliary capacities are formed in regions where auxiliary capacity portions 27, gate insulation film 32 and auxiliary capacity signal lines 25 overlap.

Further, an interlayer insulation film 16 in a two-layer structure is formed to cover TFTs 2, the gate signal lines 4 and source signal lines 5. A first layer 16a of the interlayer insulation film 16 is made of silicon nitride which serves as an inorganic insulation film, and a second layer 16b on the first layer 16a is an organic insulation film. A transparent conductive film to become pixel electrodes 7 is formed on the interlayer insulation film 16 in a two-layer structure. The pixel electrodes 7 are connected to the auxiliary capacity portions 27 of the drain extraction electrodes 15 via through holes 28 that extend through the interlayer insulation film 16. Such a structure is disclosed in, for example, Japanese Unexamined Patent Publication JP-A 9-325330 (1997) and is known to be effective, for example, in improving a numerical aperture and suppressing poor alignment of liquid crystal by shielding an electrical field generated by the signal lines because the interlayer insulation film 16 having a two-layer structure make it possible to form large pixel electrodes 7.

Like the active matrix substrate 1 according to the first prior technique described above, wiring utilizing a low resistance metallic material can be provided in such an active matrix substrate 30 having auxiliary capacities according to the second prior technique by forming an aluminum film or an aluminum alloy film primarily made of aluminum on the drain extraction electrodes 15. As in the first prior technique, the transparent conductive film to become the pixel electrodes 7 is formed after removing a low resistance metal film exposed at the bottom of through holes 28 after the formation of the through holes 28 by means of wet etching. In this case, steps are formed again by side etching as a result of the wet etching, which can cause breakage of the transparent conductive film along the entire circumference of the bottoms of the through holes 28 and can consequently cause poor contact between the transparent conductive film and the drain extraction electrodes.

Further, for example, Japanese Unexamined Patent Publication JP-A 9-5788 (1997) discloses another prior art constitution in which in order to establish conduction between conductive electrodes on upper and lower layers through a contact hole, the angle defined by the side wall and the bottom of the contact hole is made equal to or smaller than 75 degrees. Such a constitution is also unable to prevent disconnection attributable to side etching as described above.

SUMMARY OF THE INVENTION

It is an object of the invention to provide a liquid crystal display device in which wiring with a low resistance metallic material is used and in which pixel electrodes and drain extraction electrodes can be reliably connected and a method for manufacturing the same.

According to the invention, there is provided a method for manufacturing a liquid crystal display device in which a plurality of switching elements are disposed in a matrix form on a substrate; a plurality of gate signal lines for controlling respective switching elements and a plurality of source signal lines for supplying data signals to respective switching elements are disposed perpendicularly to each other; an interlayer insulation film are formed to cover the switching elements, gate signal lines and source signal lines; and liquid crystal is encapsulated between an active matrix substrate in which a plurality of pixel electrodes are formed on the interlayer insulation film which pixel electrodes are connected to drain electrodes of respective switching elements and a counter substrate confronting the active matrix substrate, the method comprising the steps of:

forming a low resistance metal film on drain extraction electrodes connected to the drain electrodes at one end thereof;

forming an interlayer insulation film to cover the switching elements, gate signal lines, source signal lines and drain extraction electrodes;

forming through holes in the interlayer insulation film to expose at least part of the periphery of the extraction electrodes at the other end thereof;

performing wet etching to remove the low resistance metal film on the drain extraction electrodes exposed in the through holes; and forming pixel electrodes extending from the drain extraction electrodes from which the low resistance metal film has been removed, to the interlayer insulation film.

According to the present invention, since the low resistance metal film is formed on the drain extraction electrodes to become resistive wiring, it is possible to provide a liquid crystal display device which has a large screen or which can be driven by a low voltage. The through holes are formed in the interlayer insulation film such that at least a part of the periphery of the drain extraction electrodes at the other end thereof is exposed. That is, a through hole is formed such that its coverage includes a region where an extraction electrode exists and a region where no extraction electrode exists. While a step is formed at an extraction electrode at the bottom of a through hole as a result of side etching which is characteristic of wet etching when the low resistance metal film on the extraction electrode is removed, the step is not formed along the entire circumference of the bottom of the through hole because the extraction electrode is not present in some region at the bottom of the through hole. Therefore, when the pixel electrodes are formed such that they extend from the interlayer insulation film down to the drain extraction electrodes in the through holes, the pixel electrodes and extraction electrodes can be reliably connected because no disconnection occurs in regions where no extraction electrode is formed even if disconnection occurs in regions where the extraction electrodes are formed. This makes it possible to reduce defective connection to thereby improve yield and reduce manufacturing cost.

In the invention, it is preferable that gate terminals are provided at the ends of the gate signal lines to establish electrical contact with gate electrodes of the switching elements; a low resistance metal film is formed on the gate signal lines at the step of forming a low resistance metal film; contact holes are formed in the interlayer insulation film to expose at least a part of the periphery of the gate signal lines at an end thereof at the step of forming through holes; the low resistance metal film on the gate signal lines exposed in the contact holes is removed through wet etching at the step of wet etching; and a conductive film is formed such that it extends from the interlayer insulation film at the periphery of the contact holes on to the inner circumference of the contact holes at the step of forming the pixel electrodes.

According to the invention, since the conductive film is formed such that it extends from the interlayer insulation film at the periphery of the contact holes on to the inner circumference of the contact holes, redundancy can be given to the wiring to the gate terminals. Since the contact holes are formed simultaneously with the formation of the through holes, a reduction in the number of manufacturing steps can be achieved to allow a cost reduction. Further, since the contact holes are formed to expose at least a part of the periphery of the gate signal lines at the ends thereof, breakage of the conductive film can be reliably prevented to improve the yield and to thereby reduce the manufacturing cost. In addition, the use of a low resistance metal film makes it possible to provide a liquid crystal display device which has a large screen or which can be driven by a low voltage.

In the invention it is preferable that source terminals for inputting signals to source terminals of the switching elements are provided at the ends of the source signal lines; a low resistance metal film is formed on the source signal lines at the step of forming a low resistance metal film; contact holes are formed in the interlayer insulation film to expose at least a part of the periphery of the source signal lines at an end thereof at the step of forming through holes; the low resistance metal film on the source signal lines exposed in the contact holes is removed through wet etching at the step of wet etching; and a conductive film is formed such that it extends from the interlayer insulation film at the periphery of the contact holes on to the inner circumference of the contact holes at the step of forming the pixel electrodes.

According to the invention, since the conductive film is formed such that it extends from the interlayer insulation film at the periphery of the contact holes on to the inner circumference of the contact holes, redundancy can be given to the wiring to the source terminals. In addition, since the low resistance metal film is formed on the source electrodes, it is possible to provide a liquid crystal display device which has a large screen or which can be driven by a low voltage. Sine the contact holes are formed to expose at least a part of the periphery of the source signal lines at the ends thereof, the breakage of the conductive film can be reliably prevented to improve the yield and to thereby reduce the manufacturing cost.

The present invention is characterized in that notches are formed at the other ends of the drain extraction electrodes and in that the through holes are formed in the interlayer insulation film such that the bottoms of the through holes extend across the notches at the other ends of the drain extraction electrodes.

According to the invention, since the through holes are formed such that the bottoms thereof extend across the notches of the drain extraction electrodes, the bottoms of the through holes are formed to cover regions where the drain extraction electrodes exist and regions where no drain extraction electrode exists. This makes it possible to prevent the disconnection of the pixel electrodes reliably. Thus, the formation of notches at the drain extraction electrodes makes it possible to prevent disconnection without changing the shape of the through holes.

According to the invention, there is provided a liquid crystal display device comprising a plurality of switching elements disposed in a matrix form on a substrate; a plurality of gate signal lines for controlling respective switching elements and a plurality of source signal lines for supplying data signals to respective switching elements disposed perpendicularly to each other; an interlayer insulation film formed to cover the switching elements, gate signal lines and source signal lines; and liquid crystal encapsulated between an active matrix substrate in which a plurality of pixel electrodes are formed on the interlayer insulation film which pixel electrodes are connected to drain electrodes of respective switching elements, and a counter substrate confronting the active matrix substrate, wherein in the active matrix substrate are formed:
a low resistance metal film on drain extraction electrodes connected to the drain electrodes at one end thereof;
an interlayer insulation film to cover the switching elements, gate signal lines, source signal lines and drain extraction electrodes;
through holes in the interlayer insulation film so that at least part of the periphery of the extraction electrodes at the other end thereof is exposed; and
pixel electrodes formed so as to extend from the drain extraction electrodes from which the low resistance metal film is removed by wet etching, on to the interlayer insulation film.

According to the present invention, since the through such that at least a part of the periphery of the extraction electrodes at the other ends thereof is exposed, side etching does not occur at the regions of the periphery of the drain extraction electrodes exposed in the through holes even when steps are formed as a result of side etching during wet etching to remove the metal film, which makes it possible to connect the pixel electrodes and extraction electrodes reliably. It is therefore possible to improve the yield and reduce the manufacturing cost.

BRIEF DESCRIPTION OF THE DRAWINGS

Other and further objects, features, and advantages of the invention will be more explicit from the following detailed description taken with reference to the drawings wherein:

FIGS. 3A to 3c are sectional views showing steps for manufacturing the active matrix substrate 50 in FIG. 1.

FIGS. 4A to 4C are sectional views showing steps for manufacturing the active matrix substrate 50 in FIG. 1.

FIGS. 6A to 6C are sectional views showing steps for manufacturing the active matrix substrate 50 in FIG. 1.

FIGS. 7A to 7C are sectional views showing steps for manufacturing the active matrix substrate 50 in FIG. 1.

DETAILED DESCRIPTION OF THE PREFERRED EMBODIMENTS

Figure 1:
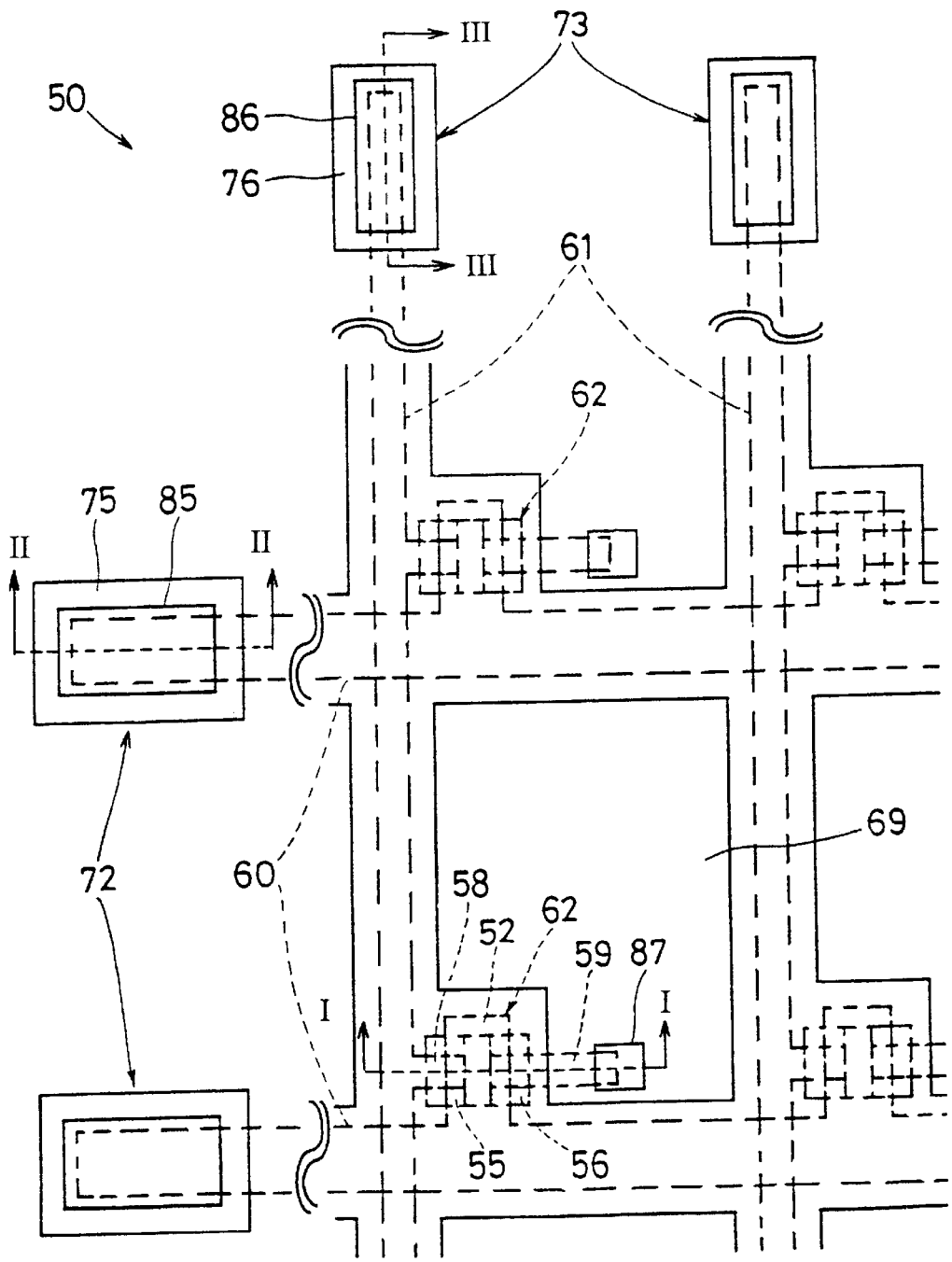
FIG. 1 is a plan view showing a structure of an active matrix substrate 50 of a liquid crystal display device which is a first embodiment of the invention.

Now referring to the drawings, preferred embodiments of the invention are described below.

Figure 2A:
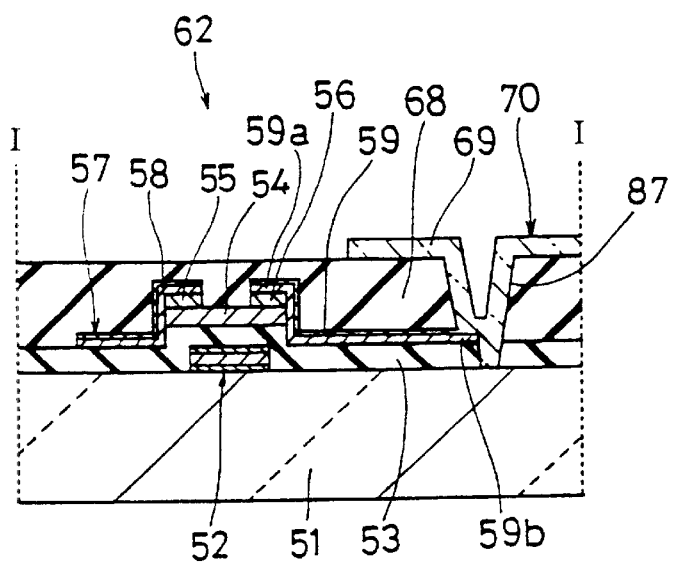
FIGS. 2A through 2c are sectional views of the active matrix substrate 50 in FIG. 1.
Figure 2B:
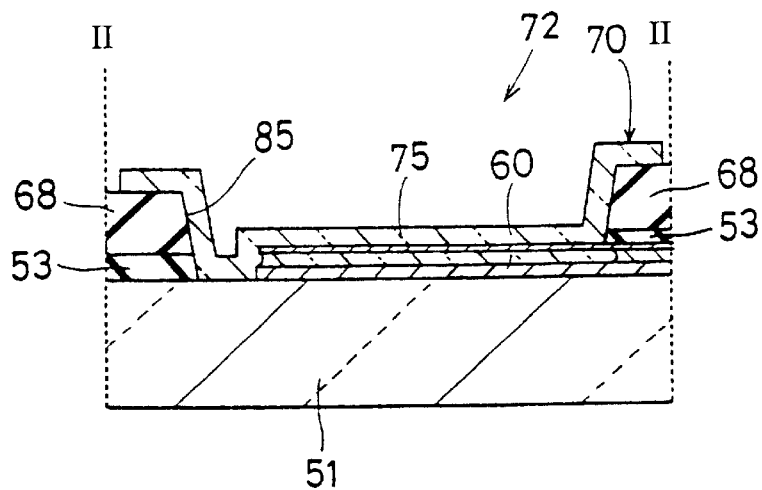
Figure 2C:
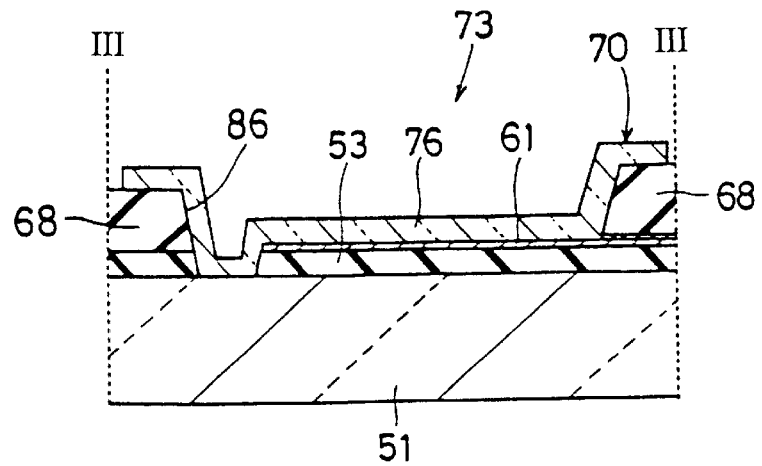

FIG. 1 is a plan view showing a structure of an active matrix substrate 50 of a liquid crystal display device which is a first embodiment of the invention. FIG. 2A is a sectional view taken along line A1—A1 in FIG. 1. FIG. 2B is a sectional view taken along line B1—B1 in FIG. 1. FIG. 2C is a sectional view taken along line C1—C1 in FIG. 1. The active matrix substrate 50 is a transparent insulating substrate 51 having TFTs 62 which are switching elements are provided thereon in a matrix form and a plurality of gate signal lines 60 for controlling the TFTs 62 and a plurality of source signal lines 61 for supplying data signals to the TFTs 62 provided perpendicularly to each other.

As shown in FIG. 2A, the TFTs 62 are configured by forming gate electrodes 52 connected to the gate signal lines 60 on the transparent insulating substrate 51, forming a gate insulation film 53 to cover the same and forming a semiconductor layer 54 and an $n^+$-Si layer to become source electrodes 55 and drain electrodes 56 such that they overlap with the gate electrodes 52.

Subsequently, a metal layer 57 to become the source signal lines 61 and source and drain extraction electrodes 58 and 59 is formed; an interlayer insulation film 68 is formed to cover the TFTs 62, gate signal lines 60 and source signal lines 61; and a transparent conductive film 70 to become pixel electrodes 69 is formed on the interlayer insulation film 68. The pixel electrodes 69 are connected to the drain extraction electrodes 59 via through holes 71 extending through the interlayer insulation film 68. As shown in FIG. 1, a source terminal 73 for transmitting a signal to the source electrode 55 of the TFT 62 is provided at an end of each source signal line 61, and a gate terminal 72 for transmitting a signal to the gate electrode 52 of the TFT 62 is provided at an end of each gate signal line 60. Conductive films 75 and 76 constituted by transparent conductive films (ITO) 70 are provided on the gate terminal 72 and source terminal 73, respectively.

FIGS. 3A through 7C are sectional views showing steps for manufacturing the active matrix substrate. They show steps for manufacturing the TFTs 62, gate terminals 72 and source terminals 73 in the form of sectional views respectively taken along lines A1—A1, B1—B1 and C1—C1 in FIG. 1.

Referring to the active matrix substrate 50, as shown in FIGS. 3A through 3C, a titanium film 52a, an aluminum film 52b and a titanium film 52c including nitrogen are formed to thicknesses of 30 nm, 100 nm and 50 nm respectively on the transparent insulating substrate 51 by the sputtering method; and the gate electrodes 52 and gate signal lines 60 are formed using photolithography and dry etching. A silicon nitride film having a thickness of 400 nm to become the gate insulation film 53, an amorphous silicon film having a thickness of 130 nm to become the semiconductor layer 54 and an $n^+$ amorphous silicon film having a thickness of 40 nm to become the source electrodes 55 and drain electrodes 56 are continuously formed thereon in the order listed using a plasma CVD process, and the patterns of the semiconductor layer 54, source electrodes 55 and drain electrodes 56 are formed using photolithography and dry etching. Next, the sputtering method is used to form a titanium film 80 and an aluminum film 81 in this order to thicknesses of 30 nm and 100 nm respectively to form the metal film 57, and the source signal lines 61 and source and drain extraction electrodes 58 and 59 are formed using photolithography and dry etching. The state shown in FIG. 3A is achieved by the above-described steps. Since the gate signal lines 60, gate electrodes 52, source signal lines 61, and source and drain extraction electrodes 58 and 59 are in a multi-layer structure including a low resistance metallic material constituted by an aluminum film, wiring with low resistance can be achieved on the active matrix substrate 50. It is noted that as used herein, the phrase "drain extraction electrode" 59 (or 58) may be used to refer to either layer 80 by itself, or alternatively layers 80 and 81 in combination regardless of whether a portion of low resistance layer 81 has been removed.

Subsequently, the following step is carried out to form regions where the gate terminals 72, source terminals 73 and pixel electrodes 69 contact the drain extraction electrodes 59.

As shown in FIGS. 4A to 4C, silicon nitride film to become the interlayer insulation film 68 is first formed to a thickness of 300 nm using a plasma CVD process on the substrate 51 having the gate signal lines 60, source signal lines 61 and TFTs 62 provided thereon. Next, as shown in FIGS. 4A through 4C, photolithography is used to form a mask pattern 88 to form contact holes 85 for the gate terminals 72, contact holes 86 for the source terminals 73 and through holes 87 for connection to the drain extraction electrodes 59.

Figures 5A, 5B, 5C:
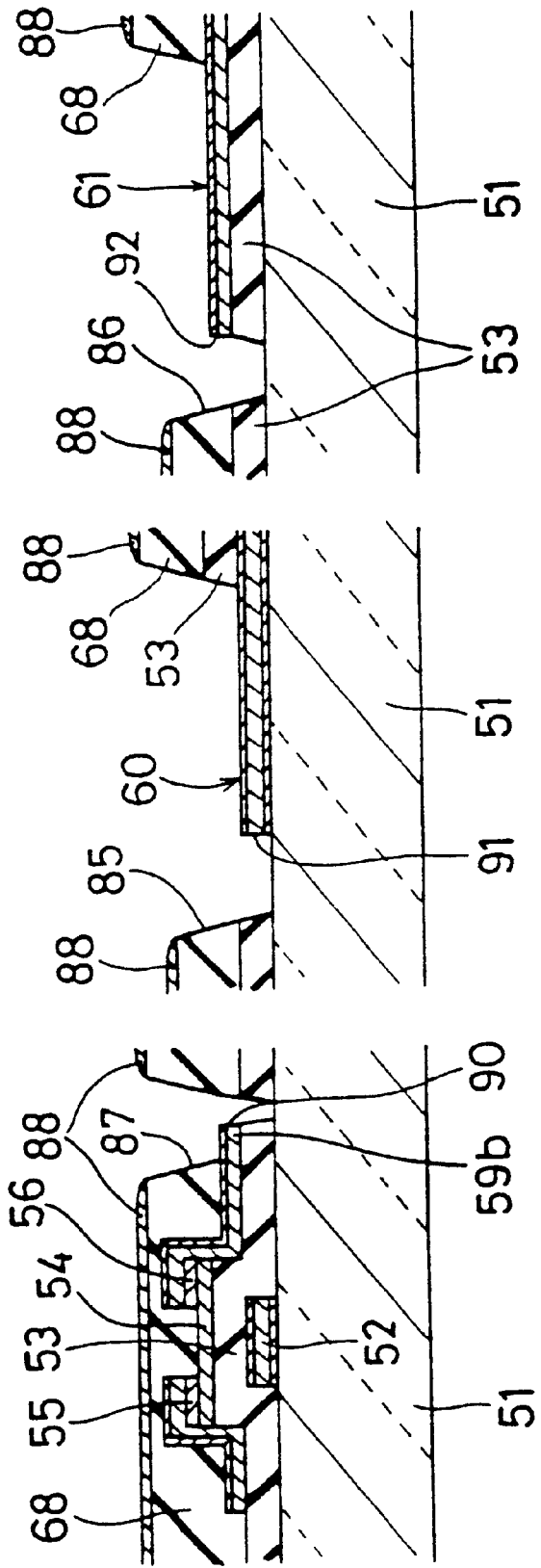
FIGS. 5A to 5C are sectional views showing steps for manufacturing the active matrix substrate 50 in FIG. 1.

As shown in FIGS. 5A to 5C, using the dry etching technique, the through holes 87 is formed on the interlayer insulation film 68 on one ends 59b of the drain extraction electrodes 59 which is connected to the drain electrodes 56 at the other end 59a; the contact holes 85 are formed in the insulation film 53 and interlayer insulation film 68 over ends of the gate signal lines 60; and the contact holes 86 are formed in the interlayer insulation film 68 over ends of the source signal lines 60. Referring to conditions for the dry etching at this time, in an RIE (reactive ion etching) mode, the power is 2.4 kW; the pressure is 300 mTorr; the etching gas is $CF_4$ ions (330 sccm) and $O_2$ (170 sccm); the gap distance is 130 mm; and the temperature is 60° C. According to the invention, it is therefore possible to form the through holes 87 and contact holes 85 and 86 at the same step, which allows a reduction in the number of manufacturing steps. The through holes 87 and contact holes 85 and 86 can be also formed using etching gases, e.g., $SF_6$ and Ar, other than the etching gases mentioned in this embodiment.

As illustrated, the through holes 87 are formed such that at least a periphery 90 of the one ends 59b of the drain extraction electrodes 59 is exposed. That is, the through holes 87 are formed such that they cover regions where the one ends 59b of the drain extraction electrodes 59 are formed and regions where the they are not formed. Similarly, the contact holes 85 are formed such that at least a periphery 91 of the ends of the gate signal lines 60 is exposed, and the contact holes 86 are formed such that at least a part of a periphery 92 of ends 61b of the source signal lines 61 is exposed.

As shown in FIGS. 6A to 6C, wet etching is used to etch the aluminum film 81 on the surface of the one ends 59b of the drain extraction electrodes 59 exposed in the through holes 87 to establish contact with the transparent conductive film (ITO) 70 to become the pixel electrodes 69. In the present embodiment, in order to provide the wiring with redundancy, it is also required to form the transparent conductive films 75 and 76 on the gate terminals 72 and source terminals 73. For this purpose, wet etching is used to etch the aluminum film 81 on the surface of the ends of the gate signal lines 60 and source signal lines 61 located in the respective contact holes 85 and 86.

Figure 8:
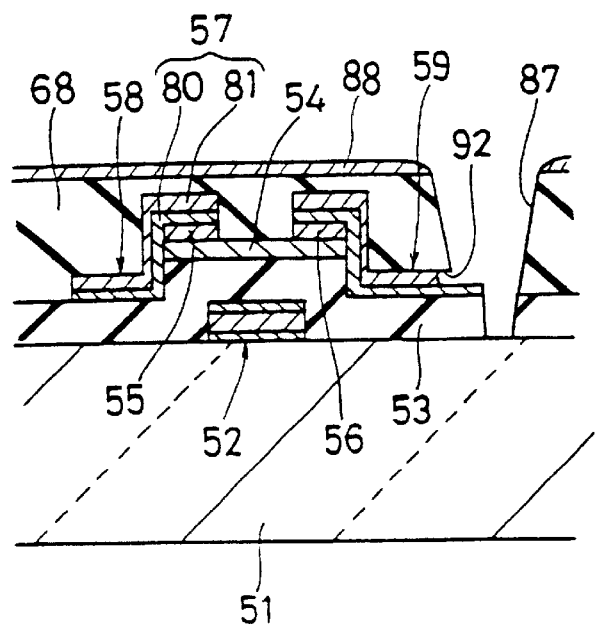
FIG. 8 is a sectional view showing side etching as a result of wet etching.
Figure 9:
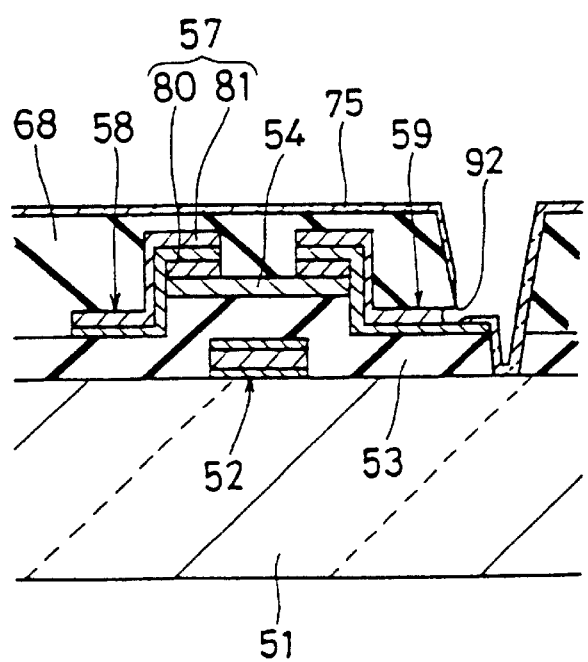
FIG. 9 is a sectional view showing disconnection caused by a step produced by side etching.

As described in the section of the related art, when only the inside of the surface of a drain extraction electrode is exposed at the bottom of a through hole, a step attributable to side etching can be formed along the entire circumference of the through hole during wet etching to the aluminum film, and disconnection of the transparent conductive film can occur along the entire circumference at such a step when the transparent conductive film is formed by the sputtering method. On the contrary, according to the present embodiment, the through hole 87 is formed to cover a region where the drain extraction electrode 59 is formed and a region where no drain extraction electrode 59 is formed as described above. Thus, the bottom of a through hole 87 defines a region where a drain extraction electrode 59 is exposed and a region where it is not exposed are formed at the bottom of the through hole 87. Therefore, when the aluminum film 81 is removed by means of wet etching, as shown in FIG. 8, a step 92 is formed by an etching shift attributable to side etching in the region where the drain extraction electrode 59 is exposed at the bottom of the through hole 87, whereas no step is formed in the region where the drain extraction electrode 59 is not exposed. As a result, when the transparent conductive film 70 to become the pixel electrodes 69 is formed such that it extends from the interlayer insulation film 68 into the through hole 87 to cover the entire inner circumference thereof, as shown in FIG. 9, no step 92 is formed at least in a part of the bottom of the through hole 87 (the right side of the bottom of the through hole 87 in FIG. 9) and no disconnection occurs in such a region to allow reliable connection between the transparent conductive film 70 to become the pixel electrodes 69 and the drain extraction electrode 59 even if disconnection of the transparent conductive film 70 occurs at the step 92.

The removal of the aluminum film 81 by means of wet etching is carried out not only at the drain extraction electrodes 59 but also at the gate terminals 72 and source terminals 73 simultaneously. Further, the transparent conductive film 70 is formed to cover also the inner circumferential surfaces of the contact holes 85 and 86 for the gate terminals 72 and source terminals 73. Since the contact holes 85 and 86 for the gate terminals 72 and source terminals 73 are also formed such that a part of the periphery of the respective signal lines 60 and 61 is exposed as described above, disconnection attributable to side etching can be prevented to allow the transparent conductive film 70 to be reliably connected to the gate signal lines 60 and source signal lines 61. Referring to the conditions for the wet etching at this time, the etchant is a mixture of sulfuric acid, nitric acid, acetic acid and water; the processing is carried out at 40° C. for 50 seconds; and washing with water is carried out at 70 l/min for 45 seconds. The amount of shift of the aluminum film 81 under these conditions is about 0.4 $\mu$m at one side.

Finally, the mask pattern applied as shown in FIGS. 6A through 6C is peeled off using a peeling solution, and as shown in FIGS. 7A through 7C, the transparent conductive film 70, which becomes the pixel electrodes 69, the conductive film 75 for the gate terminals 72 and the conductive film 76 for the source terminals 73, is formed to a thickness of 100 nm by the sputtering method and patterned to form the pixel electrodes 69 and the conductive films 75 and 76, which completes the active matrix substrate 50. The active matrix substrate 50 is fabricated using a technique that does not increase the numerical aperture in the present embodiment. When an active matrix substrate having a great numerical aperture is to be fabricated, thick photosensitive resin is used as the mask pattern for etching at one time. The use of such thick photosensitive resin also allows the formation of similar through holes. In this case, there is no need for peeling the mask pattern off, and the transparent conductive film 70 to become pixel electrodes may be formed continuously to form the pixel electrodes 69 and terminals 75 and 76, thereby fabricating the active matrix substrate. This mode of carrying out the invention will be described as a second embodiment of the invention.

An alignment film is formed on both of an active matrix substrate 50 fabricated as described above and a color filter substrate which is a counter substrate to the active matrix substrate. Those substrates are put together, and liquid crystal is injected into and encapsulated in the gap between the substrates to fabricate a liquid crystal display device. While an aluminum film is used as a low resistance wiring material in the present embodiment, the invention is not limited thereto and an alloy primarily constituted by aluminum may be used.

Figure 10:
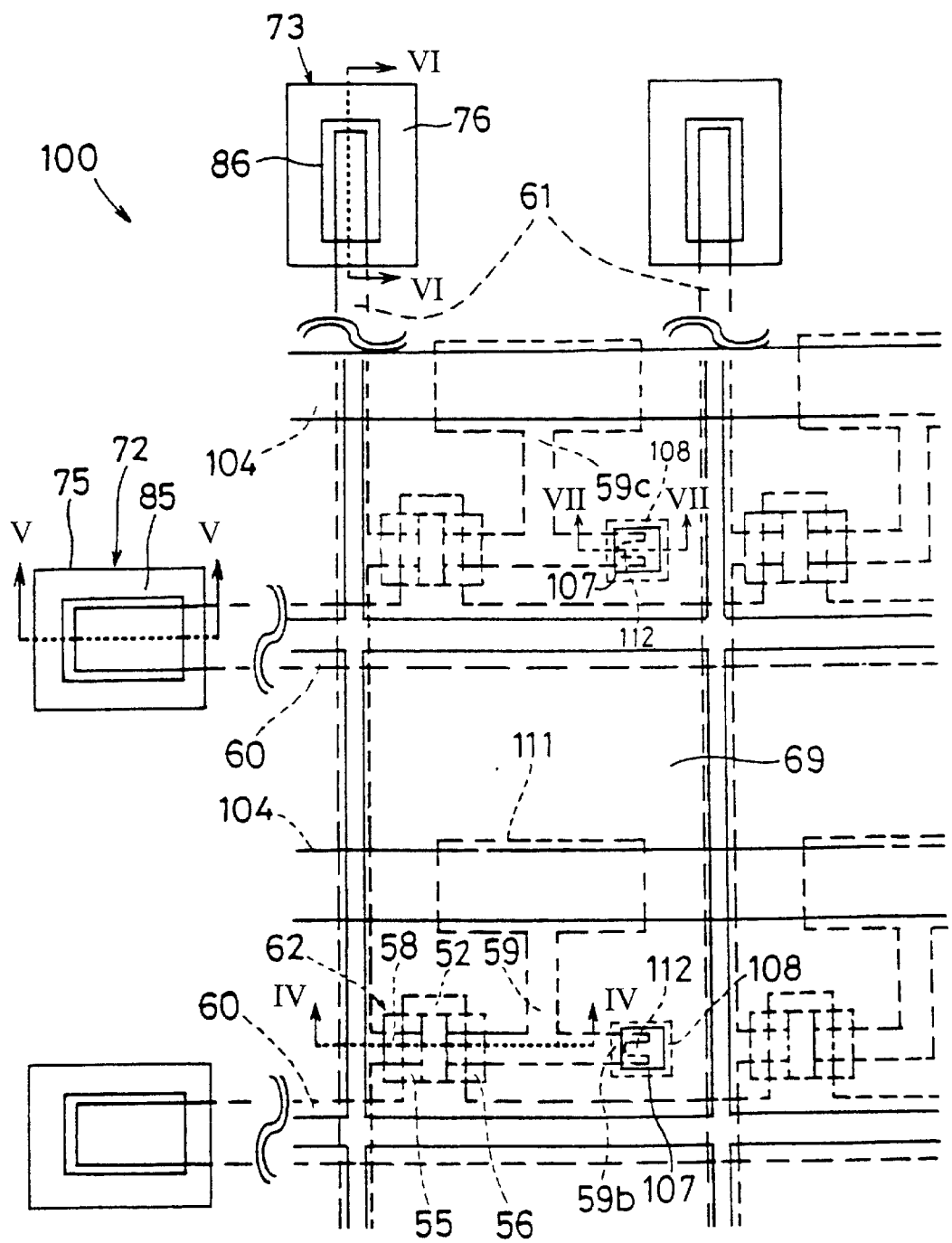
FIG. 10 is a plan view showing a structure of an active matrix substrate 100 of a liquid crystal display device which is a second embodiment of the invention.
Figure 11A:
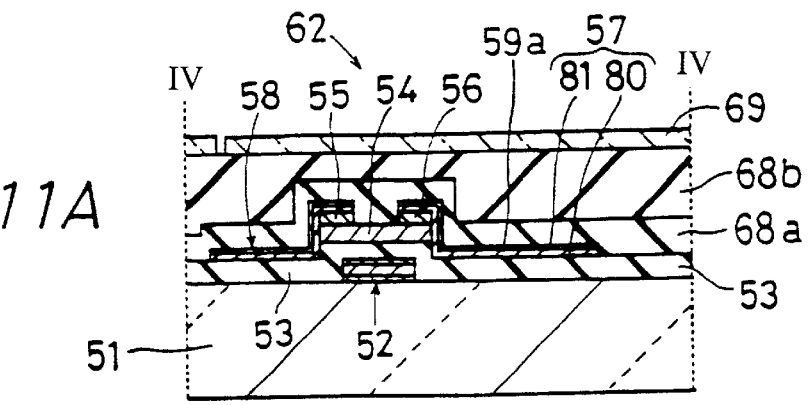
FIGS. 11A through 11D are sectional views of the active matrix substrate 100.
Figure 11B:
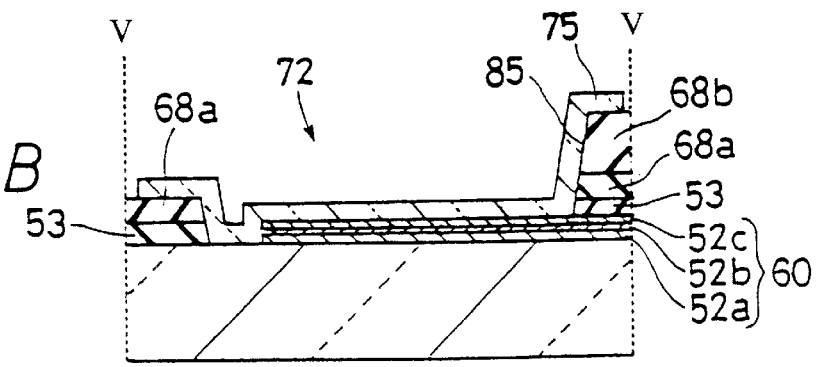
Figure 11C:
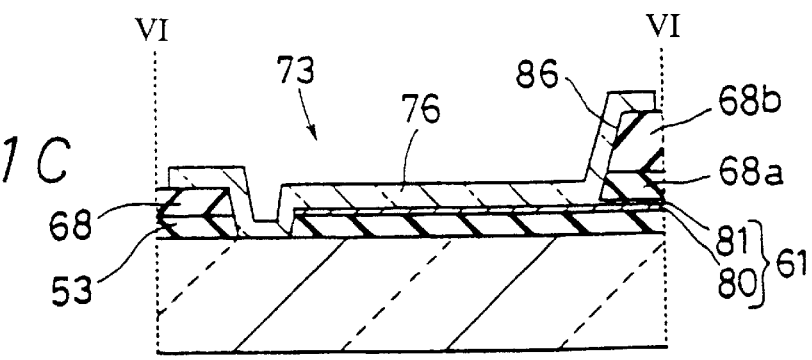
Figure 11D:
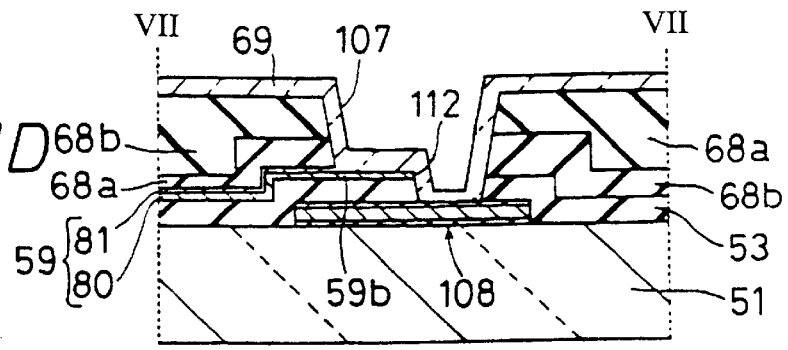
Figure 12:
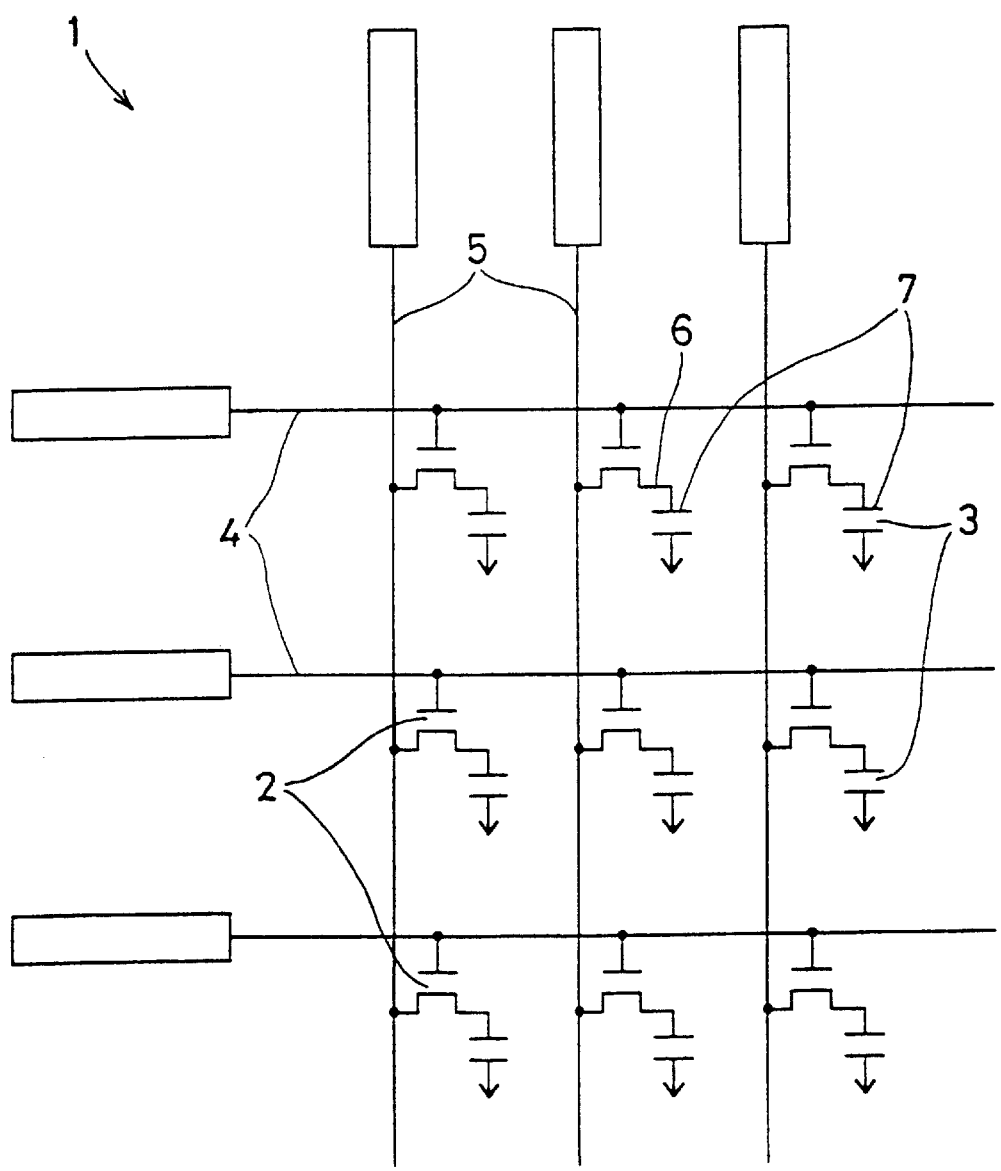
FIG. 12 is a schematic view showing a configuration of an active matrix substrate 1 of a conventional liquid crystal display device.
Figure 13:
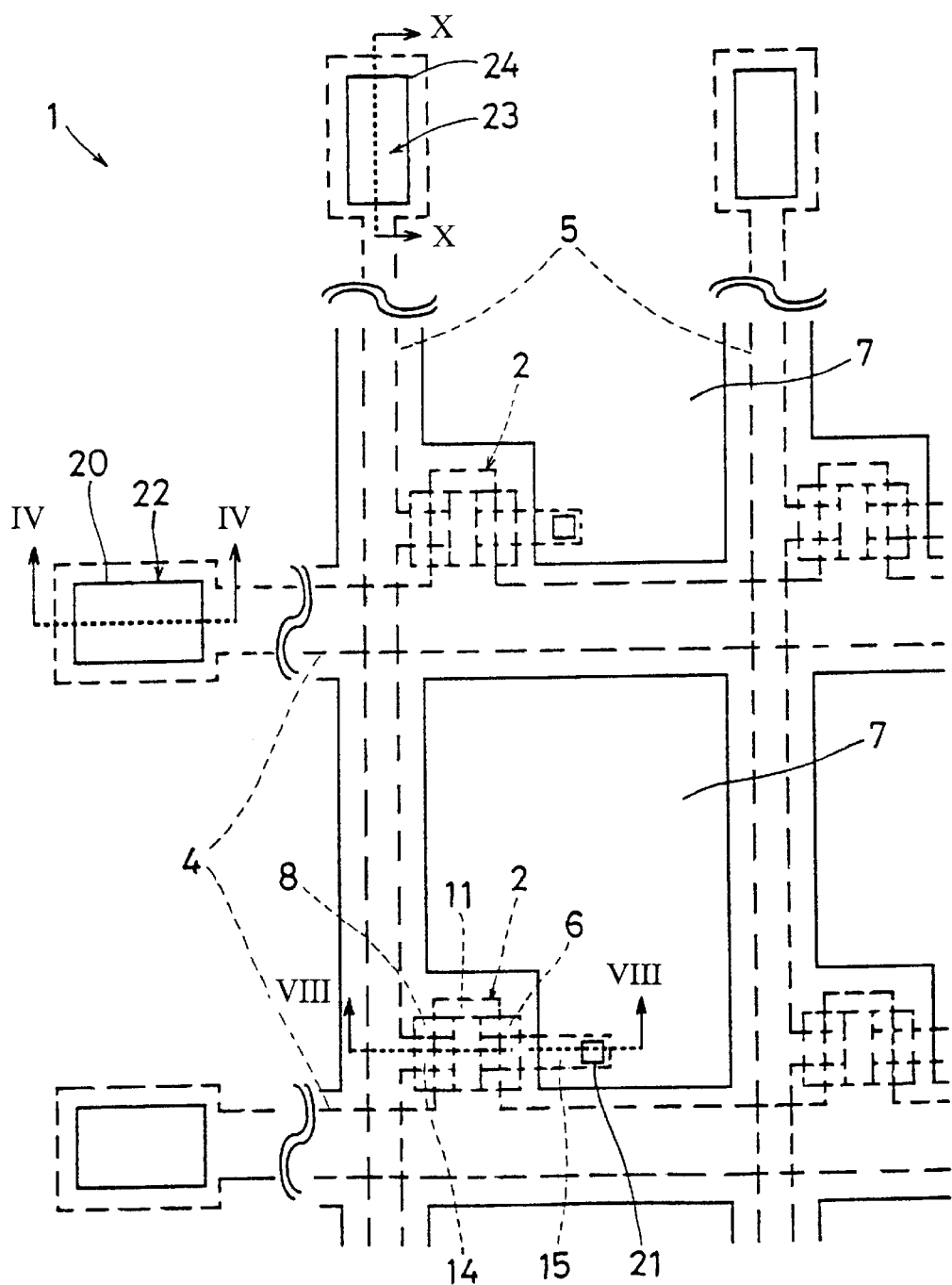
FIG. 13 is a plan view showing a configuration of the active matrix substrate 1.
Figure 14A:
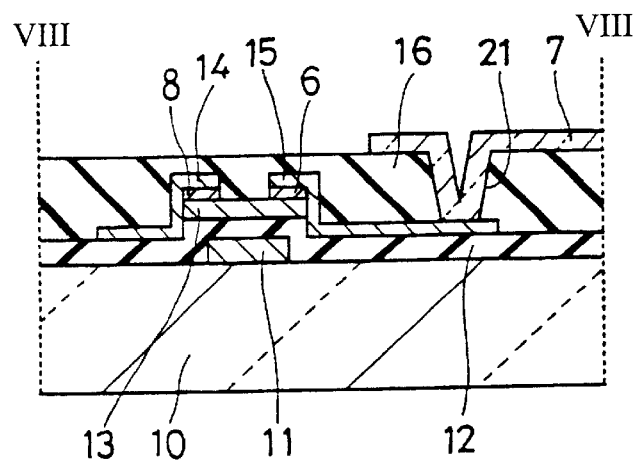
FIGS. 14A through 14C are sectional views of the active matrix substrate 1.
Figure 14B:
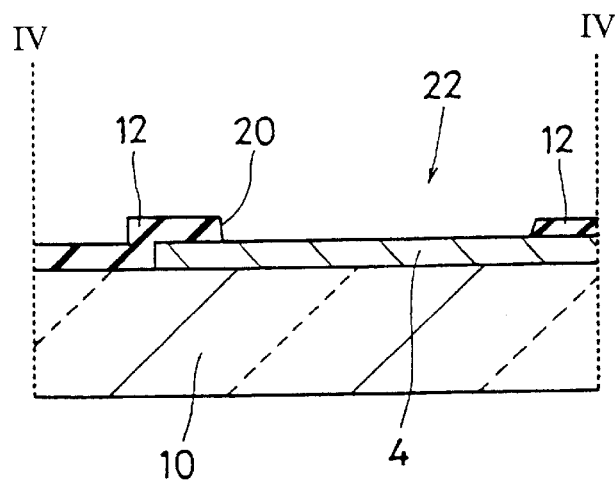
Figure 14C:
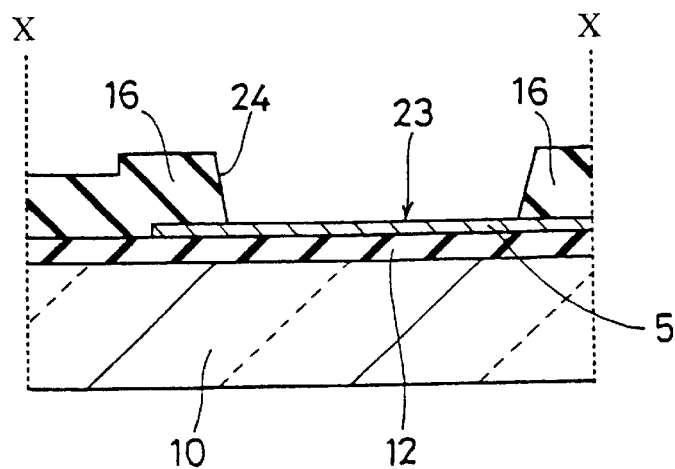
Figure 15:
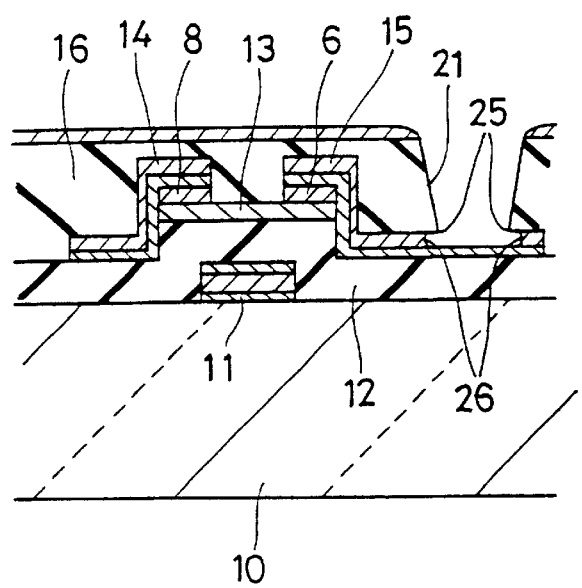
FIG. 15 is a sectional view showing side etching caused as a result of wet etching.
Figure 16:
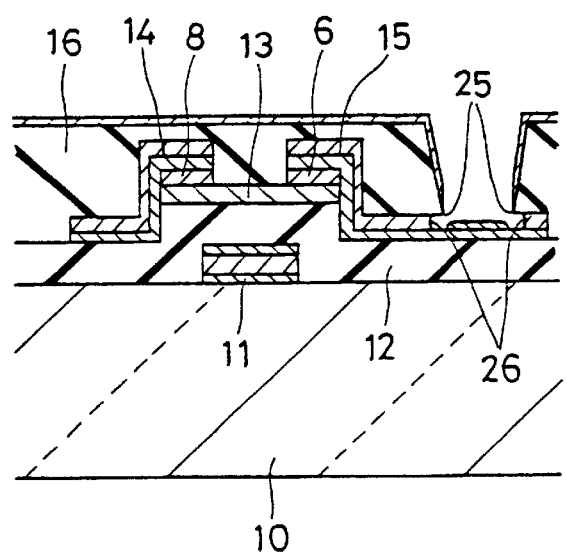
FIG. 16 is a sectional view showing disconnection of a transparent conductive film at a step produced by side etching.
Figure 17:
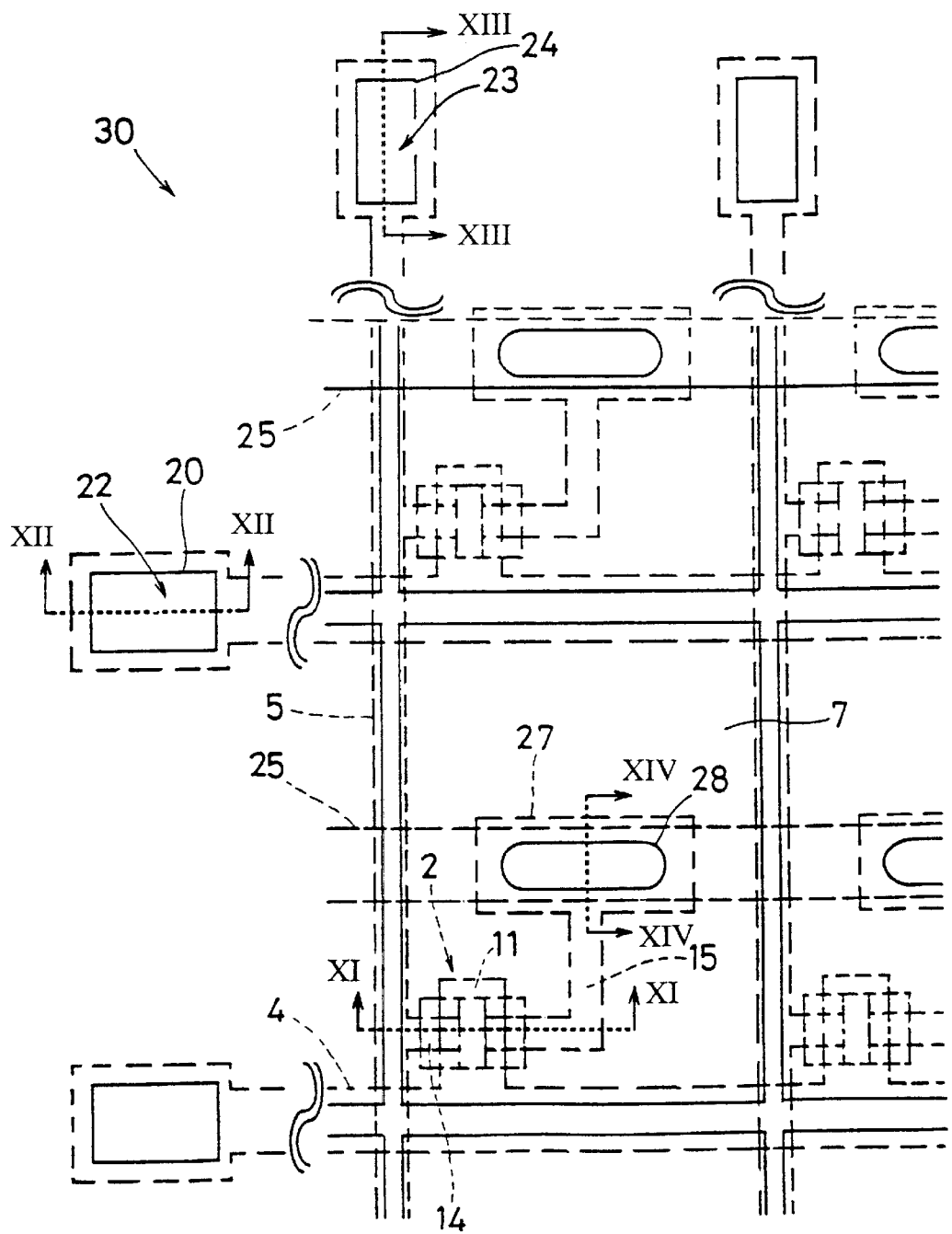
FIG. 17 is a plan view showing a configuration of an active matrix substrate 30 of a liquid crystal display device having auxiliary capacity portions according to a second conventional technique.
Figure 18A:
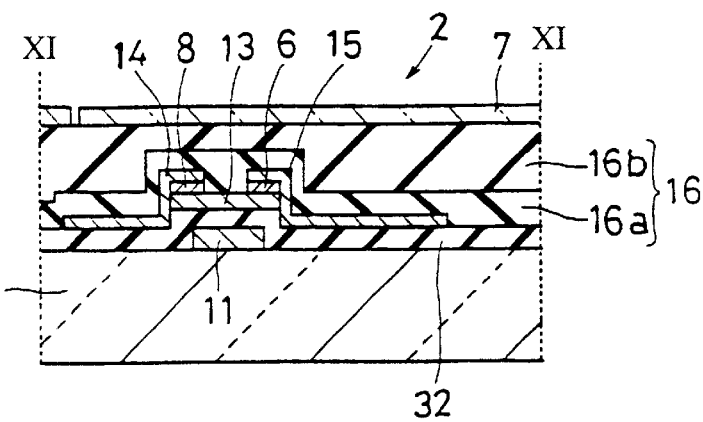
FIGS. 18A through 18D are sectional views of the active matrix substrate 30.
Figure 18B:
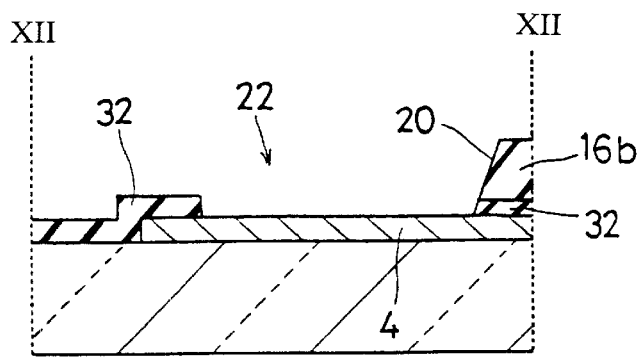
Figure 18C:
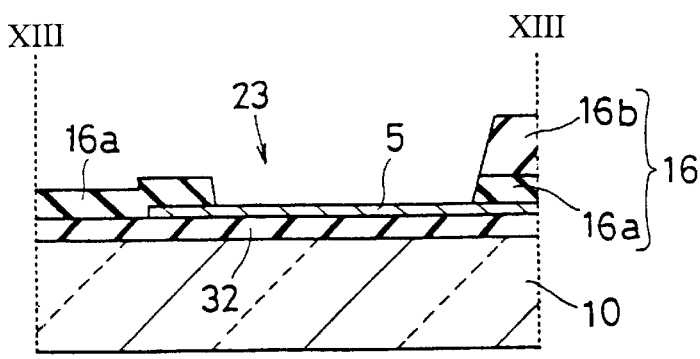
Figure 18D:
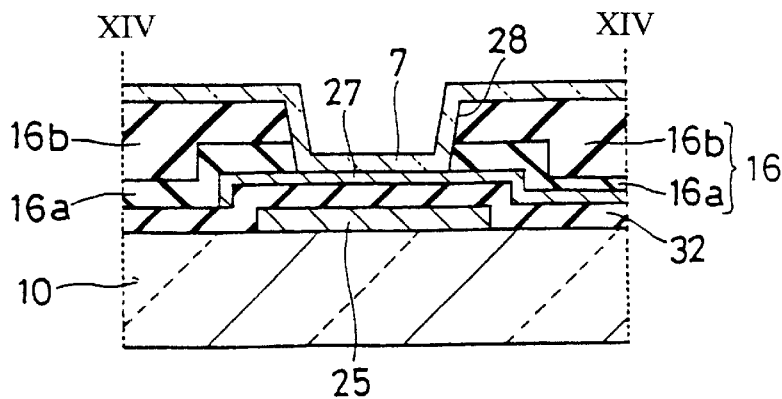

FIG. 10 is a plan view showing a structure of an active matrix substrate 100 of a liquid crystal display device having auxiliary capacities which is a second embodiment of the invention. FIG. 11A is a sectional view taken along line A2—A2 in FIG. 10. FIG. 11B is a sectional view taken along line B2—B2 in FIG. 10. FIG. 11C is a sectional view taken along line C2—C2 in FIG. 10. FIG. 11D is a sectional view taken along al line D2—D2 in FIG. 10. The present embodiment corresponds to an active matrix substrate 30 (see FIGS. 17 and 18A through 18D) according to the second prior art substrate, parts corresponding to those in the active matrix substrate 50 of the first embodiment of the invention shown in FIGS. 1 through 9 are indicated by the same reference numbers. The method for manufacturing of this embodiment are the same as that for the active matrix substrate 50 in detail.

In the active matrix substrate 100, auxiliary capacity signal lines 104 are disposed on a transparent insulating substrate 51 such as a glass substrate so as to be parallel with the gate signal lines 60 as shown in FIG. 10. Further, a light-blocking element 108 constituted by a gate film is provided under contact holes 107 for putting pixel electrodes 69 and drain extraction electrodes 59 in contact with each other. The gate signal lines 60, the auxiliary capacity signal lines 104 and the light-blocking element 108 are formed by forming a titanium film 52a, an aluminum film 52b and a titanium film 52c including nitrogen in this order on the substrate 51 to thickness of 30 nm, 100 nm and 50 nm respectively by the sputtering method, and the gate electrodes 52, gate signal lines 60, auxiliary capacity signal lines 104 and light-blocking element 108 are formed using photolithography and dry etching. A silicon nitride film having a thickness of 400 nm to become a gate insulation film 53, an amorphous silicon film having a thickness of 130 nm to become a semiconductor layer 54 and an n$^+$ amorphous silicon film having a thickness of 40 nm to become source electrodes 55 and drain electrodes 56 are continuously formed thereon using a plasma CVD process, and patterns for the semiconductor layer 54, source electrodes 55 and drain electrodes 56 are formed using photolithography and dry etching. Next, the sputtering method is used to form a titanium film 80 and an aluminum film 81 in this order to thicknesses of 30 nm and 100 nm respectively, and source signal lines 61 and source and drain extraction lines 58 and 59 are formed using photolithography and dry etching. The drain extraction electrodes 59 are connected to the pixel electrodes 69 via the through holes 107 provided over the light-blocking element 108 at the one end 59b thereof and are connected to the drain electrodes 56 at the other end 59a thereof. Branches 59c branched from the drain extraction electrodes 59 are positioned over the auxiliary capacity signal lines 104 to form auxiliary capacity portions 111.

Subsequently, a first layer 68a of the interlayer insulation film 68 is formed, and a second layer film 68b of the interlayer insulation film is patterned at a photolithographic step to form the through holes 107 to expose the drain extraction electrodes 59 and contact holes 85 and 86 to respectively expose ends of the gate signal lines 60 and source signal lines 61 using the same as a mask pattern at the same step.

Next, wet etching is performed to etch the aluminum film 81 on the surfaces of the one ends 59b of the drain extraction electrodes 59 exposed to establish contact with the transparent conductive film 70 to become the pixel electrodes 69 and the ends of the gate signal lines 60 and source signal lines 61.

While the through holes 87 of the first embodiment have been modified in configuration from conventional configurations such that the one ends 59b of the drain extraction electrodes 59 are slightly exposed at the bottoms of the through holes 87 to provide preferable electrical contact between the pixel electrodes 69 and drain extraction electrodes 59, the present embodiment achieves preferable electrical contact using a technique different from that in the first embodiment. According to the present embodiment, the one end 59b of the drain extraction electrodes 59 has a configuration as shown in FIG. 10 in which a cutout 112 is formed to extend from the middle of the periphery on a shorter side thereof toward the center. When a through hole 107 is formed in this state, the through hole is formed astride the notch. As a result, the one end 59b of the drain extraction electrode 59 is not exposed at the entire area of the bottom of the through hole 107 and, therefore, the notch 112 leaves a region where the one end 59b of the drain extraction electrode 59 is not exposed. That is, a part of the periphery of the one end 59b of the drain extraction electrode 59 is exposed as shown in the sectional view in FIG. 1D. Therefore, when the aluminum film 81 on the surface of the one end 59b of the drain extraction electrode 59 exposed at the bottom of the through hole 107 is removed by means of wet etching, no step attributable to side etching is formed at the notch 112. As a result, when the transparent conductive film 70 is formed to cover the entire inner circumferential surface of the through hole 107, the transparent conductive film 70 can be connected to the titanium film 80 under the aluminum 81 removed using wet etching without a break.

While one notch 112 per pixel is formed at each of the one ends 59b of the drain extraction electrodes 59 in the present embodiment, such a configuration is not limiting the invention, and two or three notches 112 may be provided at each of the one ends 59b of the drain extraction electrodes 59. In this case, electrical connection can be improved further because the one end 59b of the drain extraction electrode 59 is not exposed in two or three locations in the through hole 107.

In the present embodiment, the interlayer insulation film 68 in a two-layer structure is formed, which is composed of the first layer 68a and the second layer 68b. The second layer 68b is used as a mask pattern to improve the numerical aperture. Referring now to the quality and thickness of those layers, a first layer 68a is an inorganic insulation film made of silicon nitride, whereas the second layer 68b is an organic insulation film which is formed from photosensitive resin to a thickness of 3 μm. The transparent conductive film 70 to become the pixel electrodes 69 and the conductive films 75 and 76 for the gate terminals 72 and source terminals 73 is formed to a thickness of 100 nm by the sputtering method and is patterned to complete an active matrix substrate 100.

An alignment film is formed on both of the active matrix substrate 100 fabricated as described above and a color filter substrate. Those substrates are put together, and liquid crystal is injected into and encapsulated in the gap between the substrates to fabricate a liquid crystal display device.

The use of the above-described manufacturing steps makes it possible to fabricate a liquid crystal display device utilizing an aluminum film which is a low resistance wiring material with reduced steps.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for manufacturing a liquid crystal display device in which a plurality of switching elements are disposed in a matrix form on a substrate; a plurality of gate signal lines for controlling respective switching elements and a plurality of source signal lines for supplying data signals to respective switching elements are disposed perpendicularly to each other; an interlayer insulation film are formed to cover the switching elements, gate signal lines and source signal lines; and liquid crystal is encapsulated between an active matrix substrate in which a plurality of pixel electrodes are formed on the interlayer insulation film which pixel electrodes are connected to drain electrodes of respective switching elements and a counter substrate confronting the active matrix substrate, the method comprising:

forming a low resistance metal film on metal drain extraction electrodes connected to the drain electrodes at one end thereof;

forming an interlayer insulation film to cover the switching elements, gate signal lines, source signal lines and drain extraction electrodes;

forming through holes in the interlayer insulation film to expose at least part of the periphery of the extraction electrodes at the other end thereof;

performing wet etching to remove the low resistance metal film on the metal drain extraction electrodes exposed in the through holes; and forming pixel electrodes over the interlayer insulation film and extending through the through holes so as to contact the drain extraction electrodes from which the low resistance metal film has been removed.

2. A method for manufacturing a liquid crystal display device in which a plurality of switching elements are disposed in a matrix form on a substrate; a plurality of gate signal lines for controlling respective switching elements and a plurality of source signal lines for supplying data signals to respective switching elements are disposed perpendicularly to each other; an interlayer insulation film are formed to cover the switching elements, gate signal lines and source signal lines; and liquid crystal is encapsulated between an active matrix substrate in which a plurality of pixel electrodes are formed on the interlayer insulation film which pixel electrodes are connected to drain electrodes of respective switching elements and a counter substrate confronting the active matrix substrate, the method comprising:

forming a low resistance metal film on drain extraction electrodes connected to the drain electrodes at one end thereof;

forming an interlayer insulation film to cover the switching elements, gate signal lines, source signal lines and drain extraction electrodes;

forming through holes in the interlayer insulation film to expose at least part of the periphery of the extraction electrodes at the other end thereof;

performing wet etching to remove the low resistance metal film on the drain extraction electrodes exposed in the through holes;

forming pixel electrodes over the interlayer insulation film and extending through the through holes so as to contact the drain extraction electrodes from which the low resistance metal film has been removed;

wherein gate terminals are provided at the ends of the gate signal lines to establish electrical contact with gate electrodes of the switching elements;

a low resistance metal film is formed on the gate signal lines at the step of forming a low resistance metal film;

contact holes are formed in the interlayer insulation film to expose at least a part of the periphery of the gate signal lines at an end thereof at the step of forming through holes;

the low resistance metal film on the gate signal lines exposed in the contact holes is removed through wet etching at the step of wet etching; and a conductive film is formed such that it extends from the interlayer insulation film at the periphery of the contact holes on to the inner circumference of the contact holes at the step of forming the pixel electrodes.

3. A method for manufacturing a liquid crystal display device in which a plurality of switching elements are disposed in a matrix form on a substrate; a plurality of gate signal lines for controlling respective switching elements and a plurality of source signal lines for supplying data signals to respective switching elements are disposed perpendicularly to each other; an interlayer insulation film are formed to cover the switching elements, gate signal lines and source signal lines; and liquid crystal is encapsulated between an active matrix substrate in which a plurality of pixel electrodes are formed on the interlayer insulation film which pixel electrodes are connected to drain electrodes of respective switching elements and a counter substrate confronting the active matrix substrate, the method comprising:

forming a low resistance metal film on drain extraction electrodes connected to the drain electrodes at one end thereof;

forming an interlayer insulation film to cover the switching elements, gate signal lines, source signal lines and drain extraction electrodes;

forming through holes in the interlayer insulation film to expose at least part of the periphery of the extraction electrodes at the other end thereof;

performing wet etching to remove the low resistance metal film on the drain extraction electrodes exposed in the through holes;

forming pixel electrodes over the interlayer insulation film and extending through the through holes so as to contact the drain extraction electrodes from which the low resistance metal film has been removed;

wherein source terminals for inputting signals to source terminals of the switching elements are provided at the ends of the source signal lines;

a low resistance metal film is formed on the source signal lines at the step of forming a low resistance metal film;

contact holes are formed in the interlayer insulation film to expose at least a part of the periphery of the source signal lines at an end thereof at the step of forming through holes;

the low resistance metal film on the source signal lines exposed in the contact holes is removed through wet etching at the step of wet etching; and a conductive film is formed so as to extend from the interlayer insulation film at the periphery of the contact holes on to the inner circumference of the contact holes at the step of forming the pixel electrodes.

4. A method for manufacturing a liquid crystal display device in which a plurality of switching elements are disposed in a matrix form on a substrate; a plurality of gate signal lines for controlling respective switching elements and a plurality of source signal lines for supplying data signals to respective switching elements are disposed perpendicularly to each other; an interlayer insulation film are formed to cover the switching elements, gate signal lines and source signal lines; and liquid crystal is encapsulated between an active matrix substrate in which a plurality of pixel electrodes are formed on the interlayer insulation film which pixel electrodes are connected to drain electrodes of respective switching elements and a counter substrate confronting the active matrix substrate, the method comprising:

forming a low resistance metal film on drain extraction electrodes connected to the drain electrodes at one end thereof;

forming an interlayer insulation film to cover the switching elements, gate signal lines, source signal lines and drain extraction electrodes;

forming through holes in the interlayer insulation film to expose at least part of the periphery of the extraction electrodes at the other end thereof;

performing wet etching to remove the low resistance metal film on the drain extraction electrodes exposed in the through holes;

forming pixel electrodes over the interlayer insulation film and extending through the through holes so as to contact the drain extraction electrodes from which the low resistance metal film has been removed; and wherein notches are formed at the other ends of the drain extraction electrodes and in that the through holes are formed in the interlayer insulation film such that the bottoms of the through holes extend across the notches at the other ends of the drain extraction electrodes.

5. A liquid crystal display device comprising:

a plurality of switching elements disposed in a matrix form on a substrate;

a plurality of gate signal lines for controlling respective switching elements and a plurality of source signal lines for supplying data signals to respective switching elements disposed perpendicularly to each other;

an interlayer insulation film formed to cover the switching elements, gate signal lines and source signal lines; and liquid crystal encapsulated between an active matrix substrate in which a plurality of pixel electrodes are formed on the interlayer insulation film which pixel electrodes are connected to drain electrodes of respective switching elements, and a counter substrate confronting the active matrix substrate, wherein in the active matrix substrate are formed:

a low resistance metal film on drain extraction electrodes connected to the drain electrodes at one end thereof;

an interlayer insulation film to cover the switching elements, gate signal lines, source signal lines and drain extraction electrodes;

through holes in the interlayer insulation film so that at least part of the periphery of the extraction electrodes at the other end thereof is exposed; and pixel electrodes formed so as to extend from the drain extraction electrodes from which the low resistance metal film is removed by wet etching, on to the interlayer insulation film.

6. The method of claim 1, wherein said forming of the through holes in the interlayer insulation film is conducted so that in at least one of the through holes an end of the metal drain extraction electrode is exposed so that only a portion of through holes at a plane of the drain extraction electrode is occupied by the drain extraction electrode.

7. The method of claim 1, wherein each of the drain extraction electrodes extend laterally away from respective drains of respective switching elements, so that a significant portion of each drain extraction electrode does not overlie the corresponding drain.

8. The display of claim 5, wherein each of the drain extraction electrodes extend laterally away from respective drains of respective switching elements, so that a significant portion of each drain extraction electrode does not overlie the corresponding drain.

9. A liquid crystal display device comprising:

a plurality of switching elements disposed in a matrix form on a substrate;

a plurality of gate signal lines for controlling respective switching elements and a plurality of source signal lines for supplying data signals to respective switching elements disposed perpendicularly to each other;

an interlayer insulation film; and liquid crystal encapsulated between an active matrix substrate where a plurality of pixel electrodes are formed which pixel electrodes are in electrical communication with drain electrodes of respective switching elements, and a counter substrate confronting the active matrix substrate, wherein the active substrate comprises:

a low resistance metal film on drain extraction electrodes connected to the drain electrodes at one end thereof;

the interlayer insulation film at least partially covering the switching elements, gate signal lines, source signal lines and drain extraction electrodes;

through holes in the interlayer insulation film so that at least part of the periphery of the extraction electrodes at the other end thereof is exposed; and the pixel electrodes formed so as to extend from the drain extraction electrodes from which the low resistance metal film is removed, on the interlayer insulation film.

10. The device of claim 9, wherein the low resistance metal film is removed by wet etching.

11. The device of claim 9, wherein the pixel electrodes and the low resistance metal film are not in contact with one another.

12. The device of claim 9, further comprising a notch formed at the other end of at least one of the drain extraction electrodes.

* * * * *